US012180745B2

(12) United States Patent
Qiu

(10) Patent No.: US 12,180,745 B2
(45) Date of Patent: Dec. 31, 2024

(54) DOOR LOCK WITH HANDLE

(71) Applicant: CMECH (GUANGZHOU) LTD., Guangdong (CN)

(72) Inventor: Jia Sen Qiu, Guangdong (CN)

(73) Assignee: CMECH (GUANGZHOU) LTD., Guangdong (CN)

( * ) Notice: Subject to any disclaimer, the term of this patent is extended or adjusted under 35 U.S.C. 154(b) by 367 days.

(21) Appl. No.: 17/249,299

(22) Filed: Feb. 26, 2021

(65) Prior Publication Data

US 2022/0010587 A1 Jan. 13, 2022

(30) Foreign Application Priority Data

Jul. 1, 2020 (CN) ......................... 202010619727.3
Jul. 1, 2020 (CN) ......................... 202010622272.0
(Continued)

(51) Int. Cl.
*E05B 15/04* (2006.01)
*E05B 1/00* (2006.01)
(Continued)

(52) U.S. Cl.
CPC ............ *E05B 13/004* (2013.01); *E05B 1/003* (2013.01); *E05B 3/003* (2013.01); *E05B 3/065* (2013.01);
(Continued)

(58) Field of Classification Search
CPC .... E05B 2001/0076; E05B 3/003; E05B 3/06; E05B 3/065; E05B 1/003; E05B 15/04;
(Continued)

(56) References Cited

U.S. PATENT DOCUMENTS 2,661,972 A 12/1953 Schlage
3,316,003 A 4/1967 Russell et al.
(Continued)

FOREIGN PATENT DOCUMENTS

AU 2004229071 B2 7/2010
CA 2254164 A1 6/1999
(Continued)

*Primary Examiner* — Christine M Mills
*Assistant Examiner* — Noah Horowitz
(74) *Attorney, Agent, or Firm* — McKee, Voorhees & Sease, PLC

(57) ABSTRACT

A door lock for a handle, comprises a housing, a rotatable connector inside the housing, a first elastic element and a second elastic element both arranged inside the housing. The rotatable connector is interacted with the handle. The first elastic element is at least configured to provide a restoring force for the handle to return to its origin position when the handle is rotated upward to lock the door, and the second elastic element is configured to provide a restoring force for the handle to return to its origin position when the handle is rotated downward to unlock and open the door, as well as to provide enough resistance to remain handle at its origin position when the handle is released. The door lock is effort-saving for the users to rotate the handle upward, and also adapted for various handles having different weights, to be remained at the origin position when the handle is released.

6 Claims, 7 Drawing Sheets

(30) Foreign Application Priority Data

Jul. 1, 2020 (CN) ......................... 202010622790.2
Sep. 30, 2020 (CN) ......................... 202011060664.9

(51) Int. Cl.

| | |
|---|---|
| ***E05B 3/00*** | (2006.01) |
| ***E05B 3/06*** | (2006.01) |
| ***E05B 13/00*** | (2006.01) |
| ***E05B 63/04*** | (2006.01) |
| ***E05B 63/14*** | (2006.01) |
| ***E05C 1/08*** | (2006.01) |
| ***E05C 9/04*** | (2006.01) |
| *E05B 63/08* | (2006.01) |

(52) U.S. Cl.
CPC ............ *E05B 15/04* (2013.01); *E05B 63/044* (2013.01); *E05B 63/14* (2013.01); *E05C 1/085* (2013.01); *E05C 9/04* (2013.01); *E05B 2001/0076* (2013.01); *E05B 2015/0406* (2013.01); *E05B 63/08* (2013.01); *E05B 63/146* (2013.01); *E05Y 2900/132* (2013.01)

(58) Field of Classification Search
CPC ..... E05B 2015/0403; E05B 2015/0406; E05B 2015/041; E05B 55/00; E05B 3/04; E05B 63/04; E05B 63/042; E05B 63/08; E05B 63/16; E05B 2065/0805; E05C 1/16; E05C 1/163; Y10T 292/57; Y10T 292/59; Y10T 292/88; Y10T 292/93
See application file for complete search history.

(56) References Cited

U.S. PATENT DOCUMENTS 3,361,464 A 1/1968 Foster
4,243,256 A 1/1981 Frydrych
4,548,432 A 10/1985 Bengtsson
4,854,618 A 8/1989 Webster
5,123,684 A 6/1992 Yeh
5,301,525 A 4/1994 Doering
5,495,731 A 3/1996 Riznik
5,707,090 A 1/1998 Sedley
6,045,169 A 4/2000 Frolov
6,209,883 B1 4/2001 Kashmerick et al.
6,209,893 B1 4/2001 Ferris
6,209,931 B1 4/2001 Von Stoutenborough et al.
6,289,704 B1 9/2001 Collet et al.
6,349,982 B2 2/2002 Fayngersh et al.
6,393,878 B1 5/2002 Fayngersh et al.
6,622,535 B2 * 9/2003 Chiang ............... E05B 47/0692 70/277
7,108,300 B2 9/2006 Hodgin et al.
7,510,222 B2 3/2009 Hodgin et al.
8,366,158 B2 2/2013 Chen
8,371,627 B2 2/2013 Chiang et al.
8,474,884 B2 7/2013 Helisten et al.
8,523,247 B2 9/2013 Talpe
8,523,249 B2 9/2013 Hodgin et al.
8,540,288 B2 9/2013 Tsai
8,702,131 B1 4/2014 Gianoli et al.
10,890,020 B2 * 1/2021 Moon ..................... E05B 59/00
11,124,992 B2 * 9/2021 Moon ................. E05B 63/0065
11,505,973 B2 * 11/2022 Xin ......................... F16H 19/04
11,572,706 B2 * 2/2023 Qiu ....................... E05B 13/004
2002/0104339 A1 * 8/2002 Saner ...................... E05C 9/026 70/108
2004/0169378 A1 9/2004 Hodgin et al.
2005/0092042 A1 5/2005 Constantinou et al.
2005/0103066 A1 5/2005 Botha et al.
2007/0114800 A1 5/2007 Kuo
2008/0042452 A1 2/2008 Moon et al.
2009/0282877 A1 11/2009 Laverty et al.
2011/0210566 A1 9/2011 Chen
2012/0000257 A1 1/2012 Wheeler et al.
2017/0030112 A1 2/2017 Kane
2017/0275917 A1 * 9/2017 Murphy .................... E05B 3/04
2022/0010594 A1 1/2022 Qiu

FOREIGN PATENT DOCUMENTS

CN 201152085 Y 11/2008
CN 107956310 A 4/2018
CN 110630113 A 12/2019
CN 111101764 A 5/2020
DE 3605826 A1 8/1987
DE 4014041 A1 11/1991
DE 9321445 U1 2/1998
DE 20218956 U1 2/2003
EP 358971 A2 3/1990
EP 454958 A1 11/1991
EP 454965 A1 11/1991
EP 1091064 A2 4/2001
EP 1533452 A2 * 5/2005 ............. E05B 59/00
EP 1857617 A2 11/2007
EP 1865132 A1 12/2007
EP 2503080 A2 9/2012
EP 3045625 B1 11/2017
EP 3336284 A1 * 6/2018 ......... E05B 15/0053
EP 3216953 B1 10/2018
EP 3438384 A1 2/2019
ES 2324383 A1 8/2009
FR 2836505 A1 8/2003
FR 2941544 A3 * 7/2010 ......... E05B 63/0065
FR 3028547 A1 5/2016
GB 265355 10/1926
GB 2230551 A 10/1990
GB 2480258 A 11/2011
KR 101876126 B1 7/2018
KR 102042596 B1 * 11/2019
WO 02072985 A1 9/2002
WO 2006114660 A1 11/2006
WO 2007027176 A1 3/2007
WO 2008094472 A2 8/2008
WO 2015058253 A1 4/2015
WO 2019033147 A1 2/2019

* cited by examiner

DOOR LOCK WITH HANDLE

CROSS-REFERENCE TO RELATED APPLICATIONS

This application claims priority to the following four Chinese applications, and incorporate by reference their related pending US applications in their entireties:

(A) Chinese application 202010622790.2, filed Jul. 1, 2020;

(B) Chinese application 202011060664.9, filed Sep. 30, 2020; and U.S. Ser. No. 17/249,326, filed Feb. 26, 2021, MVS Ref No. P13401US00;

(C) Chinese application 202010622272.0, filed Jul. 1, 2020 and U.S. Ser. No. 17/249,314, filed Feb. 26, 2021, MVS Ref No. P13399US00; and (D) Chinese application 202010619727.3, filed Jul. 1, 2020, and U.S. Ser. No. 17/249,308, filed Feb. 26, 2021, MVS Ref No. P13400US0.

FIELD OF THE INVENTION

The following relates to the field of lockset for a pivotal door, and more particularly to a door lock with a lever type handle.

BACKGROUND OF THE INVENTION

A multipoint door lock with a handle is a lock capable of both locking the upper and the lower latches of the door while locking and unlocking the door through the rotation of the handle, where it works in the following principle: for opening the door, use a key to unlock the lock cylinder from outside the door or turn a thumb knob on the inside of the door, the deadbolt is thereby retracted, then rotate the handle downwardly to a certain angle, e.g. 45 degrees, the latch bolt is thereby retracted while the driving lever drives the upper and the lower latches inward for retraction into the top and bottom door edges, thus the door can be opened. Subsequently release of the handle, then the latch bolt extends, and the handle can be restored to its original position. For locking the door, rotate the handle upwardly to a certain angle, e.g., 45 degrees, so that the driving lever drives the upper and the lower latches to extend from the upper and lower door edges, then lock the exterior lock cylinder using a key or an interior thumb-turn knob, the deadbolt thereby extends, thus the door is locked. Subsequently release the handle, and the handle is restored to its original position. Due to the fact that the door is locked by the upper and the lower latches, the deadbolt and the latch bolt at the same time, the safety is greatly improved.

In prior art door multi-point door locks, in order to make the user have a suitable experience to rotate the handle, the elastic force of the reset spring for restoring the handle should be designed properly, because, if a reset spring has an excessive elastic force, the user will need to take more efforts to rotate the handle, especially to rotate the handle up, for overcoming both the gravity of the handle and the elastic force of the reset spring, whereas if a reset spring has too small elastic force, the operation experience to rotate the handle down will be not good, while the aesthetic appearance will get worse because the handle may possibly swing down from the horizontal position after long-term use. In addition, during the long-term use of the multipoint lock with handle, the handle may break down and be replaced with a new one, in such case, if the new handle weighs too much, it is likely that the handle will swing down from the origin position, which is generally in a horizontal direction, due to too small elastic force of the reset spring against the gravity of the handle. Therefore, in order to always remain the changed handles having different weights at the origin position, the conventional solution is to enhance the elastic force of the reset spring, that is, a reset spring is configured to have larger elastic force than the original one, however, this will undoubtedly be harder for the user to rotate the handle up, resulting in unsatisfying operation experience.

Therefore, there is great need for those skilled in the art to solve the problems as to how to reach best balance between different weights of handles and effort-saving for users.

SUMMARY OF THE INVENTION

It is an objective of the invention to provide a door lock with a handle to solve the problems above. The door lock according to the present invention can maintain handles having different weights at the origin at rest, neutral, horizontal position, and make the users to rotate the handle up easily, thereby achieving a better operational experience.

The objective is achieved by the following technical solutions:

Provided is a door lock for a lever type handle, comprising a housing and a rotatable connector inside the housing. The rotatable connector can be coupled with the handle, wherein the door lock with handle further comprises a first elastic element and a second elastic element both arranged inside the housing, wherein, the first elastic element is at least configured to provide a restoring force for the handle to return to its origin position after the handle is rotated upwardly and released;

the second elastic element is configured to provide a restoring force for the handle to return to its origin position when the handle is rotated downwardly and released, as well as to provide enough resistance to maintain the handle at its origin neutral position when the handle is released.

Further, the first elastic element is installed on the rotatable connector, and at least one end of the first elastic element is stressed against the housing during the upward rotation of the handle.

Further, the first elastic element is installed on the rotatable connector, and one end of the first elastic element is stressed against the housing during the upward rotation of the handle, while the other end of the first elastic element is stressed against the housing during the downward rotation of the handle.

Further, the housing is provided with a block adjacent to the rotatable connector, and one end of the first elastic element abuts against one side of the block, while the other end of the first elastic element abuts against the other side of the block.

Further, the first elastic element is in the form of a spring, and the rotatable connector is provided with a groove for receiving the first elastic element, a first slot and a second slot, wherein the first slot and the second slot are arranged offset from each other and are in communication with the groove respectively; one end of the first elastic element extends outwardly away from its axis to form a first extending end, and the other end of the first elastic element also extends outwardly away from its axis to form a second extending end, wherein the first extending end extends across the first slot and abuts against one side of the block, and the second extending end extends across the second slot and abuts against the other side of the block.

Further, the rotatable connector is provided with a protrusion extending away from its rotational axis, and one end of the second elastic element is stressed against the protrusion during the downward rotation of the handle.

Further, the second elastic element is in the form of a spring, and one end of the second elastic element extends towards the rotatable connector to form a third extending end, wherein the third extending end is stressed against the protrusion.

Further, the third extending end is configured to bend away from the protrusion.

As compared with the prior art, the present invention has at least the following technical advantages:

The door lock with a handle of this invention supplements a second elastic element inside the housing for cooperating with a first elastic element. During the operation of the handle for door opening/locking, the first elastic element will try to restore the handle when the handle was rotated upward, and the second elastic element will try to restore the handle when the handle was rotated downward. The second elastic element can also provide a resistance to the handle when the handle is back to the origin position, preventing the handle from swinging down due to the weight itself. In this way, even if a heavier handle is replaced in the case that the first elastic element is designed with a typical elastic force, the heavier handle can still remain at the origin position due to the resistance from the second elastic element, therefore the present invention applies to various handles having different weights because the resistance from the second elastic element counteracts the gravity of the handles and allows the handles to be remained at the origin position. As compared with the conventional solution to enhance an elastic force of the reset spring for fitting the handles having different weights, the door lock with handle according to the present invention is more effortless to rotate the handle up with a better operation experience for the first elastic element still has a typical elastic force.

BRIEF DESCRIPTION OF THE DRAWINGS

The present invention will be described hereinafter in details with reference to the figures and the embodiments for the sake of better understanding. Any non-substantive, obvious alterations or improvement by the technician of this technical field according to the present invention may be incorporated into ambit of claims of the present invention.

LIST OF REFERENCE CHARACTERS

Figure 1:
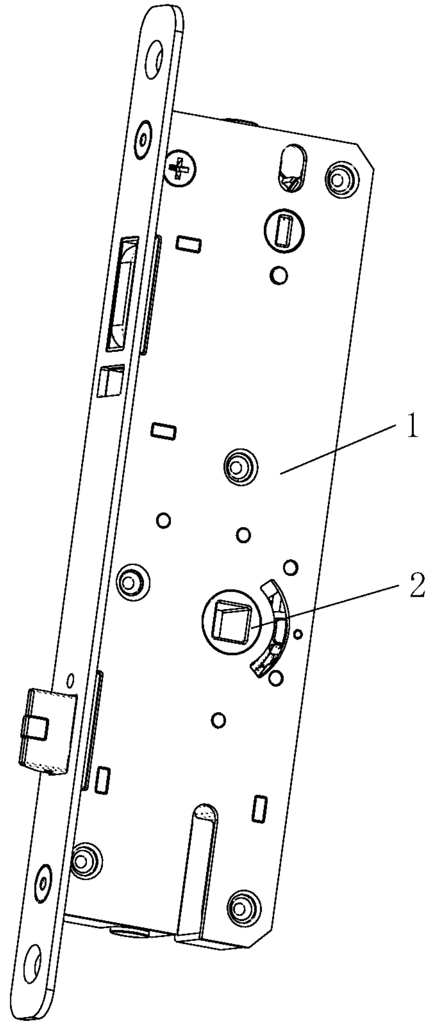
FIG. 1 is a perspective view of a door lock for a door handle, with the latch bolt extended and the dead bolt retracted, in an embodiment according to the present invention.

1 Housing
10 Handle
11 Block
2 Rotatable connector
21 Square hole
22 Protrusion
23 Groove for mounting spring
241 First slot
242 Second slot
3 First elastic element/spring
31 First extending end
32 Second extending end
4 Second elastic element/spring
41 Third extending end

DETAILED DESCRIPTION OF THE INVENTION

The present invention will be described hereinafter in details with reference to the figures and the embodiments for the sake of clarity. It should be noted that the embodiments of the present invention and the features in different embodiments may be combined if they have not conflicted each other. Although certain embodiments are described in detail for a better understanding, it should be understood that there may be more embodiments. A various changes and modifications may be obtained by those skilled in the art on the basis of the present invention without creative works and without departing the scope of the appended claims.

The technical terms used herein have the general meanings well understood by those skilled in the art unless otherwise defined. The terms in the description of the present invention have been presented for purposes of illustrating the embodiments, not limiting the present invention.

Figure 2:
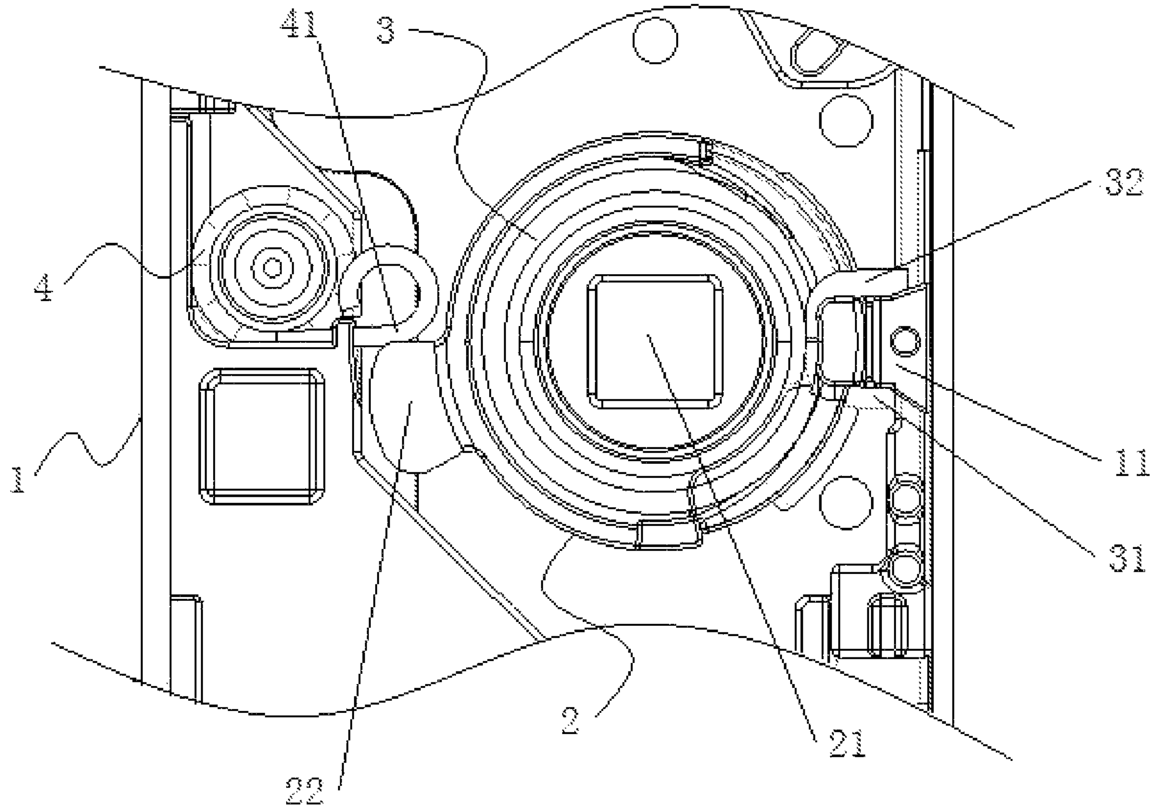
FIG. 2 is an elevation view showing the internal structure of the door lock, and the positions of the connector and the springs when the handle is in an at rest, neutral horizontal orientation, in an embodiment according to the present invention.
Figure 3:
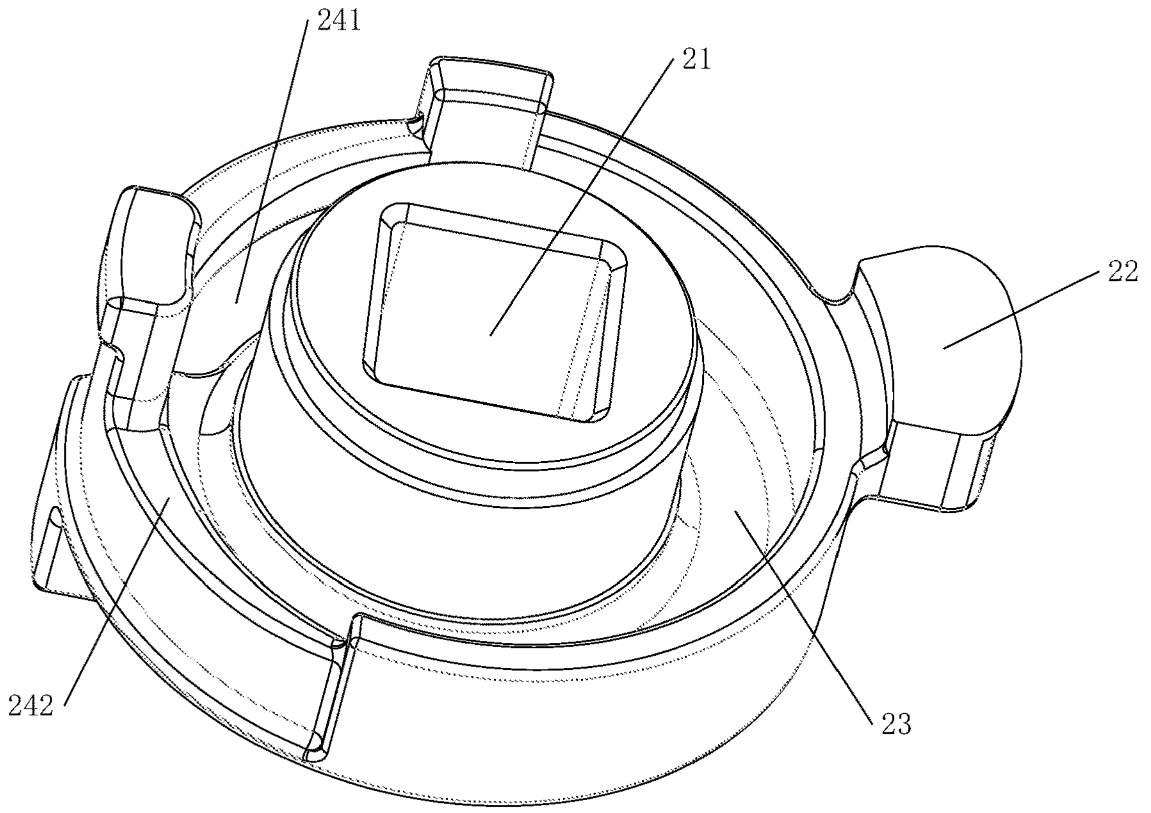
FIG. 3 is a perspective view of the structure of the rotatable connector of the door lock, in an embodiment according to the present invention.
Figure 4:
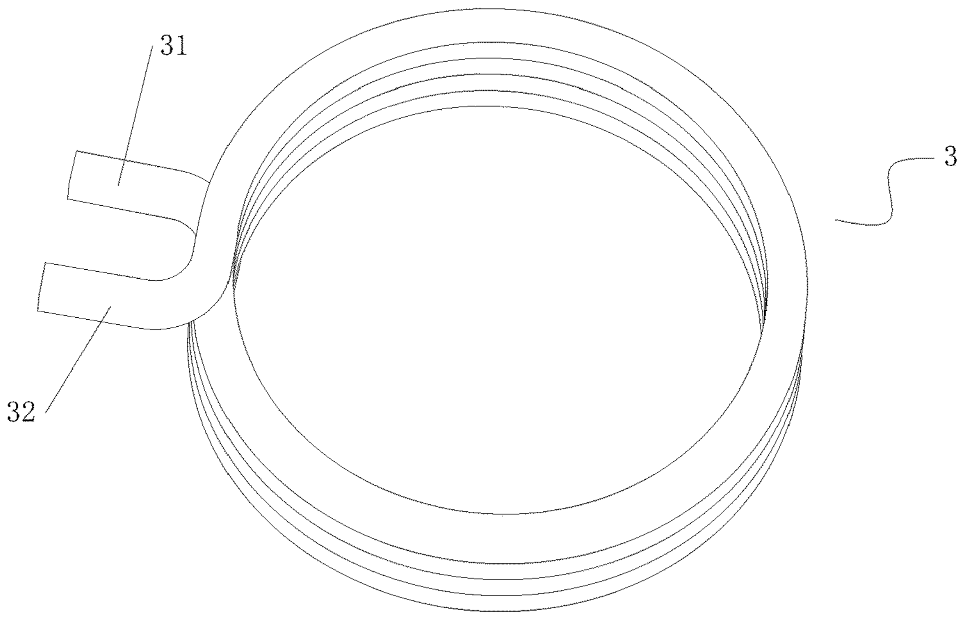
FIG. 4 is a perspective view of the first elastic element of the door lock, in an embodiment according to the present invention.

Referring to FIGS. 1 and 2, a door lock for a door handle is provided according to the present invention, comprising a housing 1, a rotatable connector 2 inside the housing 1, and a first elastic element 3 and a second elastic element 4 arranged inside the housing 1. The rotatable connector 2 is coupled with a handle 10, which preferably is a lever type handle that is pivoted downwardly to open the door and upwardly to lock the deadbolt and, if a multi-point door lock, the upper and lower latch bolts. The first elastic element 3 is at least configured to provide a restoring force for the handle 10 to return to its origin position after the handle is rotated upward to lock the door (i.e. the rotatable connector 2 was rotated in a counterclockwise direction in FIG. 2) and then released, and the second elastic element 4 is configured to provide a restoring force for the handle to return to its origin position after the handle was rotated downward to unlock and open the door (i.e. the rotatable connector 2 was rotated in a clockwise direction in FIG. 2) and then released, as well as to provide enough resistance to remain the handle at its origin position when the handle is released. The rotatable connector 2 is provided with a square hole 21 for fitting with the square shaft of a typical handle, such that the rotation of the handle will make the rotate the connector 2 simultaneously. It should be noted that, the origin position of the handle 10, which is typically in a horizontal direction, depends on the intended usage of the door lock.

The door lock with handle of this embodiment supplements the second elastic element 4 inside the housing 1 for cooperating with the first elastic element 3. During the operation of the handle 10 for door opening/locking, the first elastic element 3 will restore the handle when the handle was rotated upwardly, and the second elastic element 4 will restore the handle when the handle was rotated downward. The second elastic element 4 can also provide a resistance to the handle when the handle is back to the origin position, preventing the handle from swinging down or sagging due to the weight itself. In this way, even if a heavier replacement handle is substituted for a lighter original handle, in the case that the first elastic element 3 is designed with a typical elastic force, the heavier handle can still remain at the origin position due to the resistance from the second elastic element 4. Thus, the present invention applies to various handles having different weights because the resistance from the second elastic element 4 counteracts the gravity of the handles, regardless of their weights, and allows the handles to be remained at the origin position. As compared with the conventional solution to enhance an elastic force of the reset spring for fitting the handles having different weights, the door lock with handle according to the present invention is more effortless to rotate the handle up with a better operation experience the first elastic element 3 still has a typical elastic force.

Further, as shown in FIG. 2, in an exemplary embodiment, the first elastic element 3 is installed on the rotatable connector 2, and at least one end of the first elastic element 3 is stressed against the housing 1 during the upward rotation of the handle 10.

In this embodiment, on the basis of the above described structure, one end of the first elastic element 3 will be retained by the housing 1 and thereby deform the spring 3 as the handle 10 rotates upward. Thus, the rotatable connector 2 along with the handle can be restored under the restoring force of the first elastic element 3 when the handle is released. During the upward rotation of the handle, for the handle, only the elastic force of the first elastic element 3 and the gravity of the handle need to be overcome by the operator, and the elastic force of the second elastic element 4 is not involved because the second elastic element 4 is not stressed by the rotatable connector 2 and not deformed. Therefore, it is effort-saving for the users to rotate the handle up.

Figure 5:
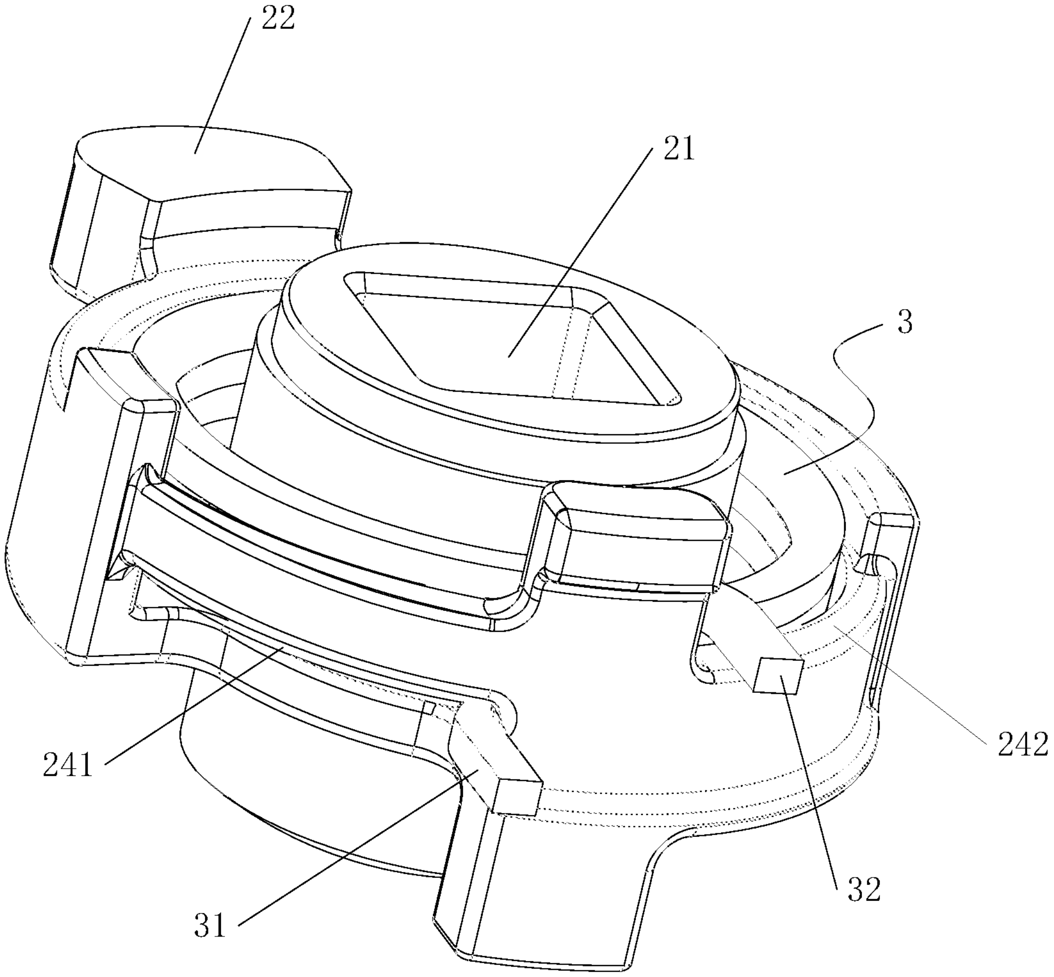
FIG. 5 is a perspective view showing the assembly of a first elastic element and a rotatable connector of the door lock, in an embodiment according to the present invention.
Figure 6:
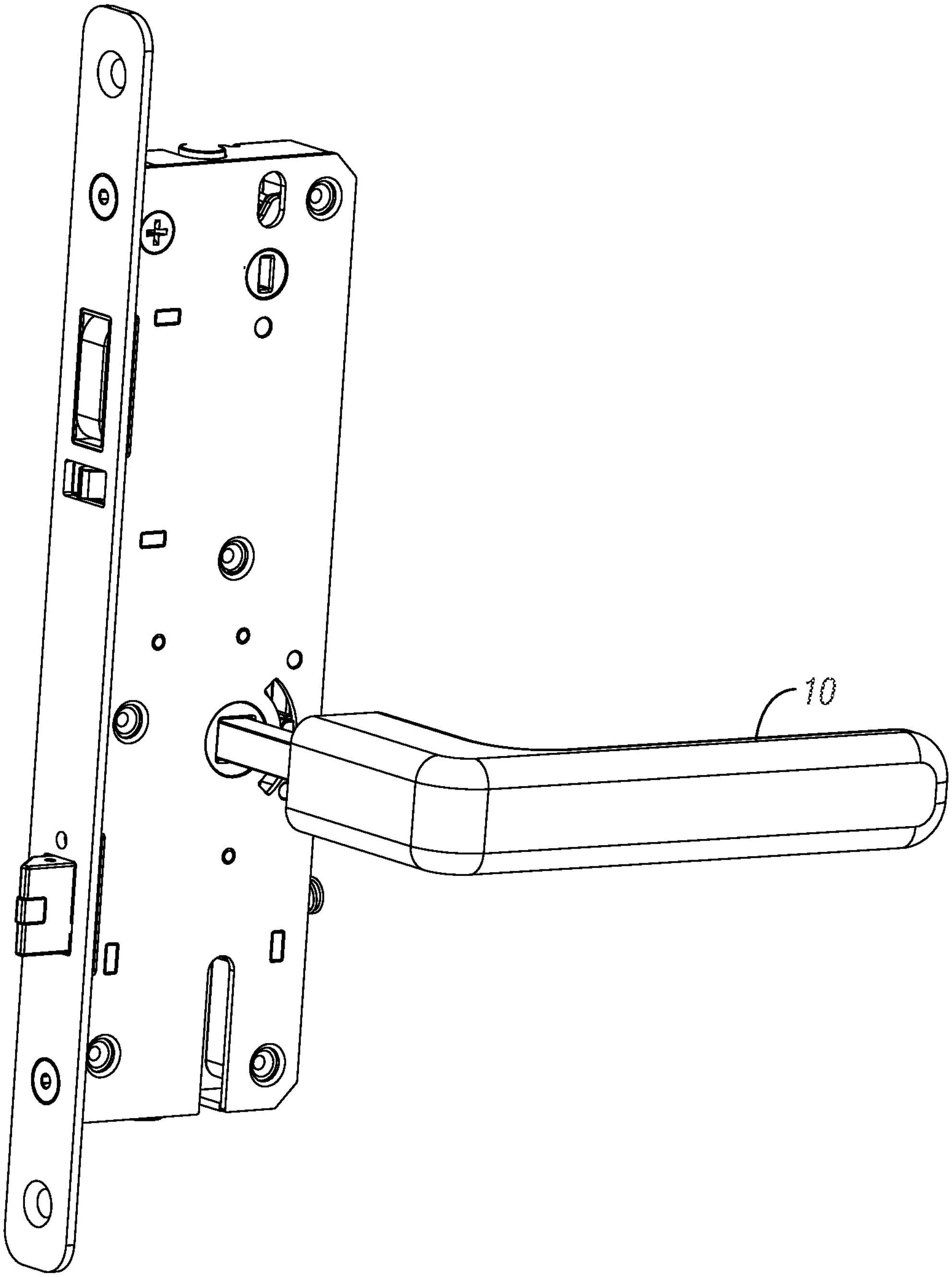
FIG. 6 is a perspective view of the door lock with a lever type handle shown in its neutral or "at rest" horizontal position.
Figure 7:
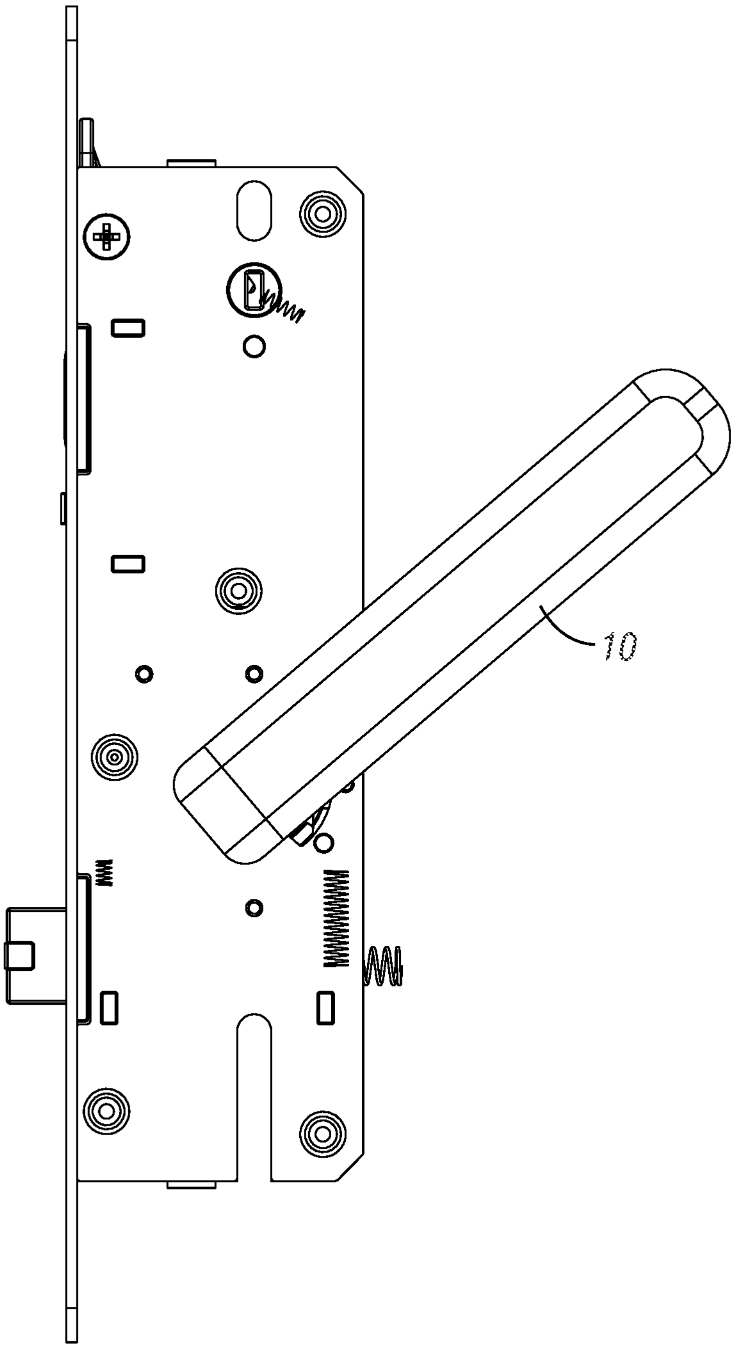
FIG. 7 is perspective view of the door lock with the handle pivoted upwardly to extend the upper and lower latches of a multi-point door lock.
Figure 8:
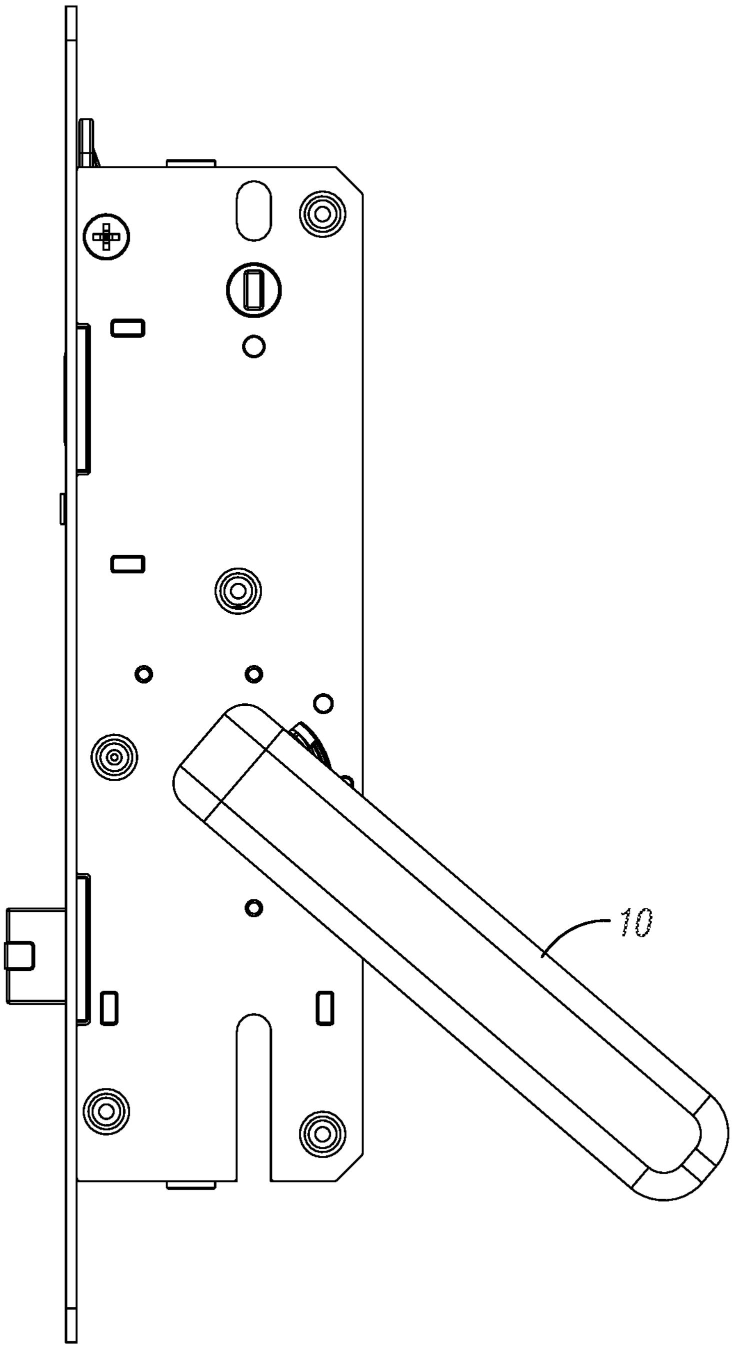
FIG. 8 is a perspective view of the door lock with the handle pivoted downwardly to retract the upper and lower latches of the multi-point lock.

Further, as shown in FIG. 5, in another exemplary embodiment, the first elastic element 3 is installed on the rotatable connector 2, wherein one end of the first elastic element 3 is stressed against the housing 1 during the upward rotation of the handle, while the other end of the first elastic element 3 is stressed against the housing 1 during the downward rotation of the handle 10.

In this embodiment, on the basis of the above described structure, the first elastic element 3 will be retained by the housing 1 and thereby be deformed as the handle 10 rotates either upward or downward. During the upward rotation of the handle, the rotatable connector 2 along with the handle can be restored under the restoring force of the first elastic element 3 when the handle is released. During the downward rotation of the handle, the rotatable connector 2 along with the handle can be restored under the restoring forces of the first elastic element 3 and the second elastic element 4 when the handle is released. In this way, the structure is not only effort-saving for the users to rotate the handle up, but also adapt for various handles having different weights, to be remained at the origin position when the handle is released.

Further, as shown in FIGS. 2 and 5, in an exemplary embodiment, the housing 1 is provided with a block 11 adjacent to the rotatable connector 2, wherein one end of the first elastic element 3 abuts against one side of the block 11, while the other end of the first elastic element 3 abuts against the other side of the block 11.

In this embodiment, on the basis of the above described structure, the first elastic element 3 will be retained by the block 11 and thereby be deformed as the handle 10 rotates either upward or downward. During the upward rotation of the handle, the rotatable connector 2 along with the handle can be restored under the restoring force of the first elastic element 3 when the handle is released. During the downward rotation of the handle, the rotatable connector 2 along with the handle can be restored under the restoring forces of the first elastic element 3 and the second elastic element 4 when the handle is released. In this way, this structure is not only effort-saving for the users to rotate the handle up, but also make the first elastic element 3 and the second elastic element 4 working together to prevent the handle from swinging down from its origin position, e.g. a horizontal direction, when the handle is released (where the first elastic element 3 generates an elastic force that counteracts gravity and the downward weight of the handle, and the second elastic element 4 provide a resistance to the rotatable connector 2), such that the various handles having different weights can be thus remained at the origin position.

Further, as shown in FIGS. 2 and 5, in an exemplary embodiment, the first elastic element 3 is in the form of a spring, the rotatable connector 2 is provided with a groove 23 for receiving the first elastic element 3, a first slot 241 and a second slot 242, wherein the first slot 241 and the second slot 242 are arranged offset from each other and are in communication with the groove 23, respectively. One end of the first elastic element 3 extends outwardly away from its axis to form a first extending end 31, and the other end of the first elastic element 3 also extends outwardly away from its axis to form a second extending end 32, where the first extending end 31 extends across the first slot 241 and abuts against one side of the block 11, and the second extending end 32 extends across the second slot 242 and abuts against the other side of the block 11.

In this embodiment, on the basis of the above described structure, the first elastic element 3 will be retained by the housing 1 and thereby be deformed as the handle 10 rotates either upward or downward. During the upward rotation of the handle, the rotatable connector 2 along with the handle can be restored under the restoring force of the first elastic element 3 when the handle is released. During the downward rotation of the handle, the rotatable connector 2 along with the handle can be restored under the restoring forces of the first elastic element 3 and the second elastic element 4 when the handle is released. The first elastic element 3 and the second elastic element 4 can work together to prevent the handle from swinging down or sagging from its origin position, e.g., a horizontal direction, when the handle is released or not being actuated, i.e., the handle is at rest in a neutral position. In this way, this structure is not only effort-saving for the users to rotate the handle up, but also adapt for various handles having different weights, to be remained at the origin position when the handle is released.

Further, as shown in FIGS. 2 and 5, in one exemplary embodiment, the rotatable connector 2 is provided with a protrusion 22 extending away from its axis, and one end of the second elastic element 4 is stressed against the protrusion 22 during the downward rotation of the handle 10 and simultaneous clockwise rotation (in FIG. 2) of the connector.

In this embodiment, on the basis of the above described structure, the second elastic element 4 will be stressed by the protrusion 22 and thereby be deformed as the handle rotates downward, thus the rotatable connector 2 along with the handle can be restored under the restoring force of the second elastic element 4 when the handle is released.

Further, as shown in FIGS. 2 and 5, in one exemplary embodiment, the second elastic element 4 is in the form of a spring, and one end of the second elastic element 4 extends towards the rotatable connector 2 to form a third extending end 41, where the third extending end 41 is stressed against the protrusion 22.

In this embodiment, on the basis of the above described structure, the third extending end 41 will be stressed by the protrusion 22 and thereby be deformed as the handle 10 rotates downward, thus the rotatable connector 2 along with the handle can be restored under the restoring force of the second elastic element 4 when the handle is released. Meanwhile, the third extending end 41 is stressed against the protrusion 22 and thereby provide a resistance to prevent the rotatable connector 2 from rotating due to the weight of the handle when the handle was released. So, this structure adapts for various handles having different weights, to be remained at the origin position when the handle is released.

Further, as shown in FIG. 2, in one exemplary embodiment, the third extending end 41 is configured to bend away from the protrusion 22.

In this embodiment, on the basis of the above described structure, the elastic property of the third extending end 41 in the second elastic element 4 is strengthened in such manner that the resistance from the second elastic element 4 is greater to counteract the gravity of a heavier handle, therefore the present invention applies to various handles having different weights to be remained at the origin position when the handle is released.

It should be noted that, the rest structure of the door lock with handle according to the present invention may be those disclosed in the cross referenced, co-pending patent applications, and will not be described in detail herein.

The embodiment described hereinbefore is merely preferred embodiment of the present invention and not for purposes of any restrictions or limitations on the invention. It will be apparent that any non-substantive, obvious alterations or improvement by the technician of this technical field according to the present invention may be incorporated into ambit of claims of the present invention.

What is claimed is:

1. A door lock with a handle, comprising:

a housing;

a monolithic rotatable connector inside the housing, the monolithic rotatable connector having a hole adapted to matingly receive a shaft of the handle, the monolithic rotatable connector having a groove extending substantially around the hole, and the monolithic rotatable connector having a protrusion extending radially outwardly beyond the groove;

a first elastic element and a second elastic element both mounted inside the housing and both engaging the monolithic rotatable connector, wherein;

the first elastic element is installed in the groove on the monolithic rotatable connector so as to extend around the hole and the shaft of the handle;

a first end of the first elastic element is stressed against the housing during the upward rotation of the handle and a second end of the first elastic element is stressed against the housing during the downward rotation of the handle;

the first elastic element is at least configured to provide a restoring force for the handle to return to its origin position after the handle is released from an upward rotation and after the handle is released from a downward rotation; and the second elastic element is installed offset from the monolithic rotatable connector and is stressed against the protrusion of the monolithic rotatable connector to provide a restoring force for the handle to return to its origin position after the handle is released from the downward rotation, and to provide enough resistance to maintain the handle at its origin position when the handle is released.

2. The door lock according to claim 1, wherein the housing is provided with a block adjacent to the monolithic rotatable connector, and the first end of the first elastic element abuts against one side of the block, while the second end of the first elastic element abuts against an opposite side of the block.

3. The door lock according to claim 2, wherein the first elastic element is in the form of a spring, the monolithic rotatable connector is provided with a first slot and a second slot, wherein the first slot and the second slot are arranged offset from each other and are in communication with the groove respectively;

the first end of the first elastic element extending outwardly away from its axis, and the second end of the first elastic element extends outwardly away from its axis, wherein the first end extends across the first slot and abuts against the one side of the block, and the second end extends across the second slot and abuts against the opposite side of the block.

4. The door lock according to claim 1, wherein the second elastic element is in the form of a spring, and the one end of the second elastic element extends towards the monolithic rotatable connector, wherein the one end is stressed against the protrusion.

5. The door lock according to claim 4, wherein the one end of the second elastic element is configured to bend away from the protrusion.

6. The door lock of claim 1 wherein the first and second elastic elements are coil springs.

* * * * *